United States Patent [19]
Martens et al.

[11] Patent Number: 5,907,866
[45] Date of Patent: May 25, 1999

[54] BLOCK ADDRESS TRANSLATION CIRCUIT USING TWO-BIT TO FOUR-BIT ENCODER

[75] Inventors: David James Martens; Terence Matthew Potter, both of Austin, Tex.

[73] Assignee: International Business Machines Corporation, Armonk, N.Y.

[21] Appl. No.: 08/770,220

[22] Filed: Dec. 19, 1996

[51] Int. Cl.[6] ................................................. G06F 12/10
[52] U.S. Cl. ............................................................ 711/206
[58] Field of Search .................................. 711/203, 206, 711/207, 208, 209

[56] References Cited

U.S. PATENT DOCUMENTS

| | | | |
|---|---|---|---|
| 4,763,250 | 8/1988 | Keshlear et al. | 711/208 |
| 4,890,223 | 12/1989 | Cruess et al. | 711/207 |
| 4,922,415 | 5/1990 | Hemdal | 711/206 |
| 5,526,504 | 6/1996 | Hsu et al. | 711/207 |
| 5,530,822 | 6/1996 | Beavers et al. | 711/207 |
| 5,530,824 | 6/1996 | Peng et al. | 711/207 |
| 5,764,589 | 6/1998 | Lotfi | 365/230.06 |
| 5,778,407 | 7/1998 | Glew et al. | 711/2 |

*Primary Examiner*—Eddie P. Chan
*Assistant Examiner*—Kevin L. Ellis
*Attorney, Agent, or Firm*—Winstead Sechrest & Minick P.C.; Anthony V. S. England

[57] ABSTRACT

An approach for determining whether a current address is within an address range in which both the starting address of the range and the size of the address range are determined by variable register contents. Whereas the information in the variable register contents is in binary format, the current address is in a 2B format. The present invention provides logic for translating the binary formatted information so that it can be compared to the 2B formatted current address.

24 Claims, 3 Drawing Sheets

BLOCK ADDRESS TRANSLATION CIRCUIT USING TWO-BIT TO FOUR-BIT ENCODER

CROSS-REFERENCE TO RELATED APPLICATION

COMPARATOR CIRCUIT USING TWO-BIT TO FOUR-BIT ENCODER, U.S. patent application Ser. No. 08/697,099, incorporated herein by reference.

FIELD OF THE INVENTION

The present invention relates to information handling systems and circuits for translating an effective address to a real address. Specifically, the present invention relates to circuits for determining whether an address is within a range of addresses.

BACKGROUND OF THE INVENTION

During microprocessor operation, every memory access must go through an address translation process before the data can be fetched from or written to the memory subsystem. Block Address Translation (BAT) is one of two possible methods for performing this necessary translation. In this process, the current address needing translation is compared to a range of addresses stored in BAT registers. If the current address is found to be within this range, the BAT circuitry will provide an indication that the BAT circuitry is capable of providing the necessary address translation. If the address is not within this range, the BAT circuitry cannot perform the translation and a secondary method of translation must be employed.

The determination of whether the BAT circuit can provide a translation is made by referencing two fields within a register in the BAT circuitry. The first field within the register is for the starting address of the block for which this BAT circuit is providing a translation. The second field within the register is for the length of the block for which the BAT circuit is providing a translation. An example of valid block lengths are illustrated in Table 1.

The circuit logic required to determine if an address is within a specified address range (starting at address $2^m$ and ending on address $\{2^n-1\}$ where m and n are positive integers and m<n) is well known and straightforward. For example, if it were necessary to determine whether the address B[0:7] (with B0 being the most-significant bit) was within the eight bit address range from addresses 64 to 127, it is necessary only to compare the bit B[1] to a logic "1" and bit B[0] to a logic "0". Based on the binary representations of each address in this address range, it can be seen that this comparison would generate a match for all addresses between 64 and 127, inclusive.

The binary representation for numbers is particularly convenient for this address matching task. However, if the traditional binary representation of numbers is not used, the nature of the problem changes considerably. In certain microprocessor designs, many numbers and busses are represented in a signaling format described as 2B format. This signaling format encodes data into groups of two bits represented by four signals with only one out of the four signals active at any time. From this description, we can see that the numbers zero through three would be represented as "1000", "0100", "0010" and "0001", respectively. The use of 2B formatting of signals adds considerable complexity to the logic that determines whether an address is within a predefined range. Therefore, the need exists for a method and apparatus to determine whether a current address is within a range of addresses when the addresses are represented by a number of binary logic bits in a format such as the 2B format.

SUMMARY OF THE INVENTION

Accordingly, the present invention is directed to circuitry for encoding a set of bits, representing a current address, into a corresponding encoded set wherein only one bit of the encoded set has a predefined logic state and includes a logic circuit for translating address range information into bits that can be compared to the encoded set of bits of the current address.

The present invention is also directed to an address translation circuit for translating an effective address into a real address including the circuit described above.

The present invention is also directed to a method for determining whether a current address is within a range of addresses, wherein the addresses are represented by a number of binary logic bits. The method comprises the steps of encoding a set of the bits of the current address into a corresponding encoded set wherein only one bit of the encoded set has a predefined logic state, and translating a set of bits, which indicate the range of addresses, into a corresponding translated set of bits for comparing to the encoded set of bits of the current address.

TABLE 1

Block Mask Bits and Segment Size for BAT

| | Effective Page Index Bits | | | | | | | | | | | | | | | Block Mask Bits | | | | | | | | | | |
|---|---|---|---|---|---|---|---|---|---|---|---|---|---|---|---|---|---|---|---|---|---|---|---|---|---|---|
| BLK SIZE | 0 | 1 | 2 | 3 | 4 | 5 | 6 | 7 | 8 | 9 | 10 | 11 | 12 | 13 | 14 | 19 | 20 | 21 | 22 | 23 | 24 | 25 | 26 | 27 | 28 | 29 |
| 128K | * | * | * | * | * | * | * | * | * | * | * | * | * | * | * | 0 | 0 | 0 | 0 | 0 | 0 | 0 | 0 | 0 | 0 | 0 |
| 256K | * | * | * | * | * | * | * | * | * | * | * | * | * | * | X | 0 | 0 | 0 | 0 | 0 | 0 | 0 | 0 | 0 | 0 | 1 |
| 512K | * | * | * | * | * | * | * | * | * | * | * | * | * | X | X | 0 | 0 | 0 | 0 | 0 | 0 | 0 | 0 | 0 | 1 | 1 |
| 1M | * | * | * | * | * | * | * | * | * | * | * | * | X | X | X | 0 | 0 | 0 | 0 | 0 | 0 | 0 | 0 | 1 | 1 | 1 |
| 2M | * | * | * | * | * | * | * | * | * | * | * | X | X | X | X | 0 | 0 | 0 | 0 | 0 | 0 | 0 | 1 | 1 | 1 | 1 |
| 4M | * | * | * | * | * | * | * | * | * | * | X | X | X | X | X | 0 | 0 | 0 | 0 | 0 | 0 | 1 | 1 | 1 | 1 | 1 |
| 8M | * | * | * | * | * | * | * | * | * | X | X | X | X | X | X | 0 | 0 | 0 | 0 | 0 | 1 | 1 | 1 | 1 | 1 | 1 |
| 16M | * | * | * | * | * | * | * | * | X | X | X | X | X | X | X | 0 | 0 | 0 | 0 | 1 | 1 | 1 | 1 | 1 | 1 | 1 |
| 32M | * | * | * | * | * | * | * | X | X | X | X | X | X | X | X | 0 | 0 | 0 | 1 | 1 | 1 | 1 | 1 | 1 | 1 | 1 |
| 64M | * | * | * | * | * | * | X | X | X | X | X | X | X | X | X | 0 | 0 | 1 | 1 | 1 | 1 | 1 | 1 | 1 | 1 | 1 |
| 128M | * | * | * | * | * | X | X | X | X | X | X | X | X | X | X | 0 | 1 | 1 | 1 | 1 | 1 | 1 | 1 | 1 | 1 | 1 |
| 256M | * | * | * | * | X | X | X | X | X | X | X | X | X | X | X | 1 | 1 | 1 | 1 | 1 | 1 | 1 | 1 | 1 | 1 | 1 |

The present invention is also directed toward a method for translating an effective address into a real address including the steps of the method described above.

One advantage of the present invention is the provision of a circuit for determining whether an address is within a range of addresses wherein the address is in 2B encoded format and information relating to the range of addresses is in binary format.

The invention is also advantageous in that the circuit uses a very limited number of transistors.

DETAILED DESCRIPTION OF A PREFERRED EMBODIMENT OF THE INVENTION

Referring again to Table 1, the mask bits allow an information handling or computer system to determine the size of the address range for the BAT register providing a translation. Effectively, an Effective Page Index Bit that has its corresponding Block Mask Bit set will not be used in the address comparison—only higher order bits will be used. The BAT register bits, i.e., the Effective Page Index Bits and Block Mask Bits, are stored in binary, i.e., non-encoded, format. Therefore, some format translation is necessary before a comparison to a number that is in 2B format can be made. For determining whether an address is within a range of addresses programmed into BAT register fields, the Block Masking Bits in the BAT register are combined with the Effective Page Index Bits in the BAT. Also, a binary-to-2B format translation is performed, a resulting "masked-2B" formatted bus may be inputted to a compare circuit.

Circuitry for comparing two numbers in 2B format is disclosed in COMPARE CIRCUIT USING TWO-BIT TO FOUR-BIT ENCODER, U.S. patent application Ser. No. 08/697,099, of common assignee, which is hereby incorporated herein by reference. The circuitry disclosed therein compares two bits of each number or address encoded in 2B format for equivalence, and signals a "Match" (also known as a "Hit") if they are identical or equal. An embodiment disclosed uses 12 transistors to implement this circuit. A second circuit which compares two bits of each number or address encoded in 2B format for non-equivalence is also disclosed. This circuit, using 20 transistors, signals a "miss" if the numbers are not identical or equal. By combining the results of N stages of this logic, two numbers or addresses of size 2N logical bits may be compared for equivalence or non-equivalence. It is to be understood that if an address is within a range of addresses assigned to a particular BAT, then that BAT may be used to translate the address to a new address. Thus, a "common" compare circuit may be used to generate both the "match" and "miss" signals.

Figures 1, 2:
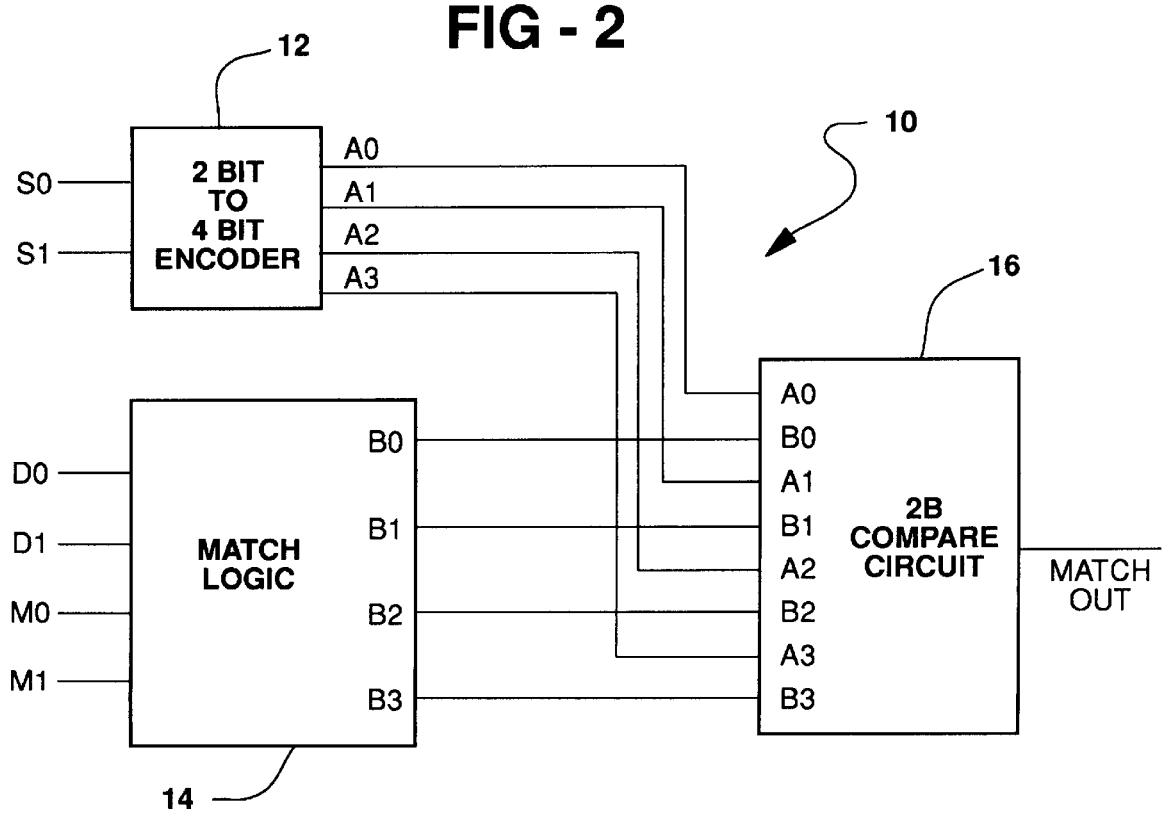
FIG. 1 illustrates the two-bit to four-bit encoding scheme utilized in the present invention.
FIG. 2 is a schematic block diagram of a circuit for determining whether a current address is within a range of addresses according to the present invention.

The present invention is designed to work with the encoding scheme illustrated in FIG. 1. Referring to FIG. 1, the two-bit to four-bit encoding scheme referred to as 2B encoding or 2B encoded format is shown wherein a signal comprising two or more bits is encoded according to the scheme depicted in FIG. 1. The binary logic bits of the signal are grouped into sets of two binary logic bits S0, S1. The bits S0, S1 are then encoded into a four-bit representation comprising output bits A0, A1, A2, and A3 as illustrated in FIG. 1. FIG. 1 provides only one example to illustrate the present invention. It will be appreciated that a signal having any number of bits equal to or greater than two may be utilized with the present invention.

Referring to FIG. 2, a circuit 10 for determining whether an address is within a range of addresses according to the present invention is shown. A signal having two bits, S0 and S1, as set forth in FIG. 1, is inputted into circuit 10 to determine whether an address represented by the signal is within a range of addresses. Circuit 10 includes a two-bit to four-bit encoder 12. Encoder 12 has as input bits S0 and S1 and as output bits A0, A1, A2, and A3. In this manner, encoder 12 is a two-bit to four-bit encoder which maps bits S0, S1 into A0, A1, A2, and A3 according to the encoding scheme set forth in FIG. 1. For example, if bits S1 and S0 are 0 bits, bits A3, A2, A1 will be 0 and bit A0 will be 1. It is to be noted that only one of the four bits outputted from encoder 12 is in the high state or on state (that is, logical 1 at any one time). It will be appreciated that any number of two-bit to four-bit encoders may be employed to accommodate signals or addresses having any number of bits greater than or equal to two bits.

Circuit 10 further includes match logic 14. Match logic 14 inputs bits D0, D1, M0, and M1 and outputs bits B0, B1, B2, and B3 according to the truth table set forth in Table 2, wherein bits D0, D1 represent stored data for the starting address of the address range; bits M0, M1 represent stored data for the size of the address range; and bits B0, B1, B2, and B3 represent the result of the logical operation that includes the 2B encoding of bits D0, D1 and the application of the appropriate mask bits.

TABLE 2

Truth Table for Masking and 2B Encoding for Hit Generation

| D0 | D1 | M0 | M1 | B0 | B1 | B2 | B3 |
|----|----|----|----|----|----|----|----|
| 0 | 0 | 0 | 0 | 0 | 0 | 0 | 1 |
| 0 | 1 | 0 | 0 | 0 | 0 | 1 | 0 |
| 1 | 0 | 0 | 0 | 0 | 1 | 0 | 0 |
| 1 | 1 | 0 | 0 | 1 | 0 | 0 | 0 |
| 0 | 0 | 0 | 1 | 0 | 0 | 1 | 1 |
| 0 | 1 | 0 | 1 | 0 | 0 | 1 | 1 |
| 1 | 0 | 0 | 1 | 1 | 1 | 0 | 0 |
| 1 | 1 | 0 | 1 | 1 | 1 | 0 | 0 |
| 0 | 0 | 1 | 0 | 0 | 1 | 0 | 1 |
| 0 | 1 | 1 | 0 | 1 | 0 | 1 | 0 |
| 1 | 0 | 1 | 0 | 0 | 1 | 0 | 1 |
| 1 | 1 | 1 | 0 | 1 | 0 | 1 | 0 |
| 0 | 0 | 1 | 1 | 1 | 1 | 1 | 1 |
| 0 | 1 | 1 | 1 | 1 | 1 | 1 | 1 |
| 1 | 0 | 1 | 1 | 1 | 1 | 1 | 1 |
| 1 | 1 | 1 | 1 | 1 | 1 | 1 | 1 |

Circuit 10 further includes a compare circuit 16 for comparing bits A0 through A3 to bits B0 through B3 to determine whether the bit pairs A0,B0; A1,B1; A2,B2; and A3,B3 are equal to each other. Thus, compare circuit 16 has as inputs bits A0 through A3 and bits B0 through B3 and a single output for indicating whether bits A0 through A3 equal bits B0 through B3. If bits A0 through A3 and bits B0 through B3 are equal, a "match" is said to have occurred, meaning the address represented by binary formatted bits S0, S1 and 2B formatted bits A0 through A3 are within the address range identified by bits D0, D1, M0, and M1.

Figure 3:
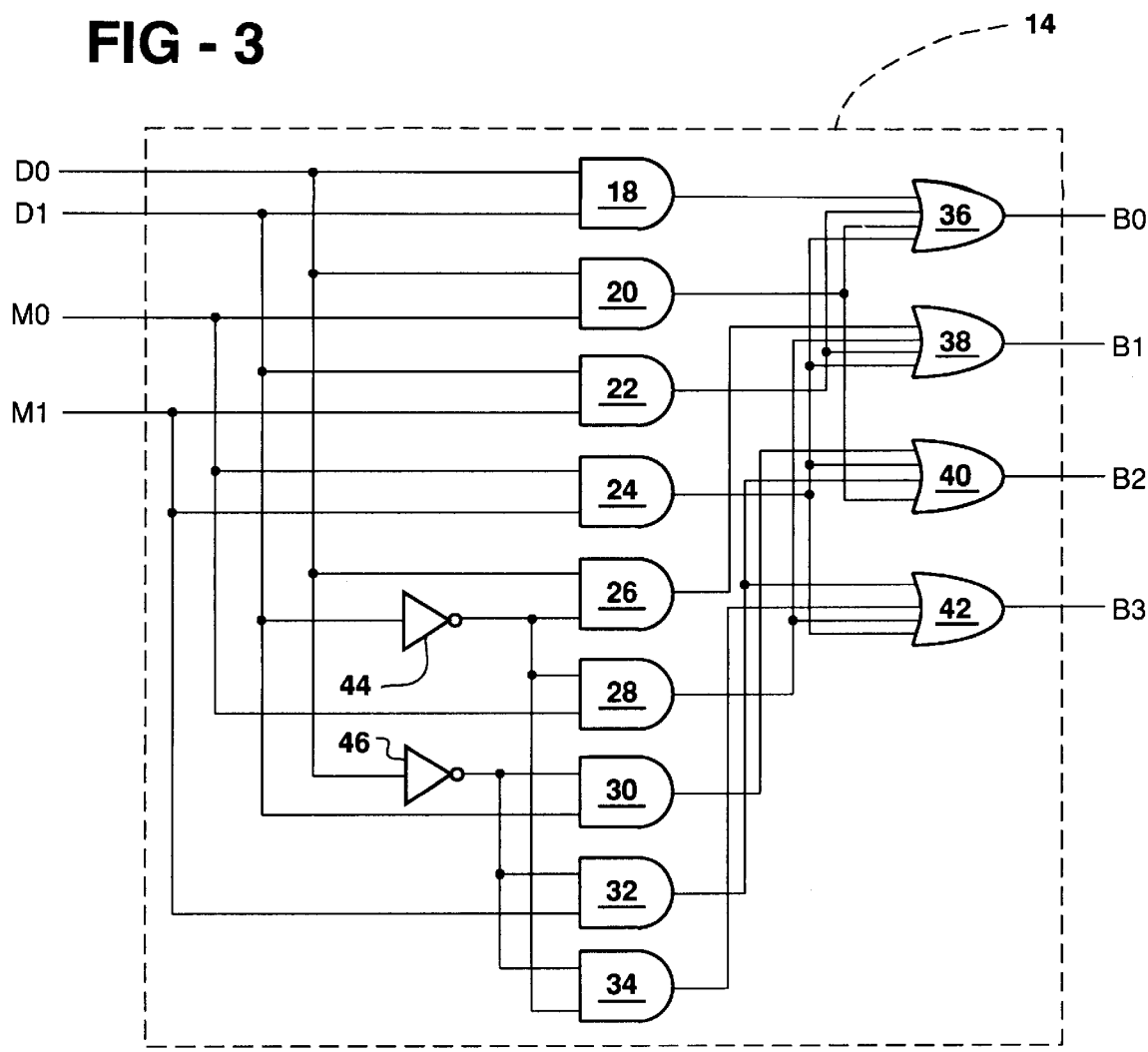
FIG. 3 is a logic diagram of the match logic block set forth in FIG. 2 according to the present invention.

Referring now to FIG. 3, the logic utilized in match logic 14 will be described in greater detail. Match logic 14 includes a plurality of AND gates 18, 20, 22, 24, 26, 28, 30, 32, 34 and a plurality of OR gates 36, 38, 40, and 42. AND gate 18 ANDs bits D0 and D1 and its output is coupled to OR gate 36. AND gate 20 ANDs bits D0 and M0, and its output is coupled to OR gates 36 and 40. AND gate 22 ANDs bits D1 and M1, and its output is coupled to OR gates 36 and 38. AND gate 24 ANDs bits M0 and M1, and its output is coupled to OR gates 36, 38, 40, and 42. AND gate 26 ANDs bits D0 and $\overline{D1}$, and its output is coupled to OR gate 38. An inverter 44 is provided to generate $\overline{D1}$. AND gate 28 ANDs bits $\overline{D1}$ and M0, and its output is coupled to OR gates 38 and 42. AND gate 30 ANDs bits $\overline{D0}$ and bit D1, and its output is coupled to OR gate 40. $\overline{D0}$ is generated by inverter 46. AND gate 32 ANDs bit $\overline{D0}$ and bit M1, and its output is coupled to OR gates 40 and 42. AND gate 34 ANDs bits $\overline{D0}$ and $\overline{D1}$, and its output is coupled to OR gate 42. The outputs of OR gates 36, 38, 40, and 42 are bits B0, B1, B2, B3, respectively.

Figure 4:
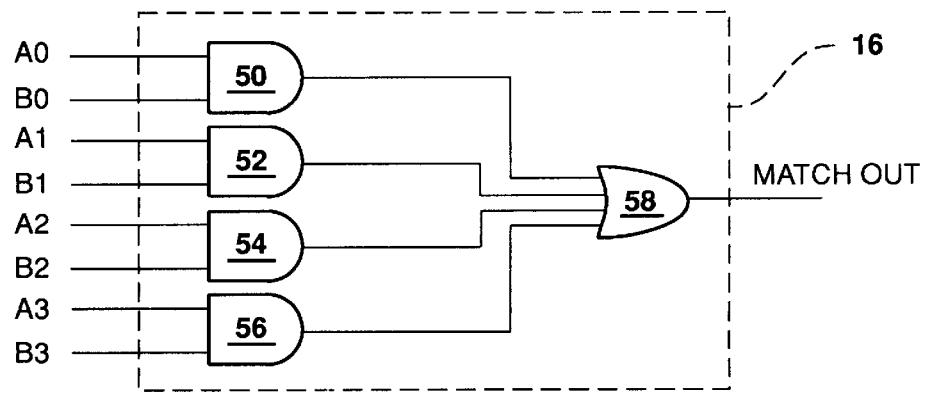
FIG. 4 is a logic diagram of the 2B compare circuit set forth in FIG. 2 according to the present invention.

Referring now to FIG. 4, a logic block diagram of circuit 16 will be described. Circuit 16 includes AND gates 50, 52, 54, and 56 and OR gate 58. AND gate 50 ANDs bit A0 and B0, and its output is coupled to OR gate 58. AND gate 52 ANDs bit A1 and B1, and its output is coupled to OR gate 58. AND gate 54 ANDs bit A2 and B2, and its output is coupled to OR gate 58. AND gate 56 ANDs bit A3 and B3, and its output is coupled to OR gate 58. The output of OR gate 58 is the match out signal wherein a logical 1 represents that bits A0 through A3 are equal to bits B0 through B3, or in other words, a match or hit has occurred.

Figure 5:
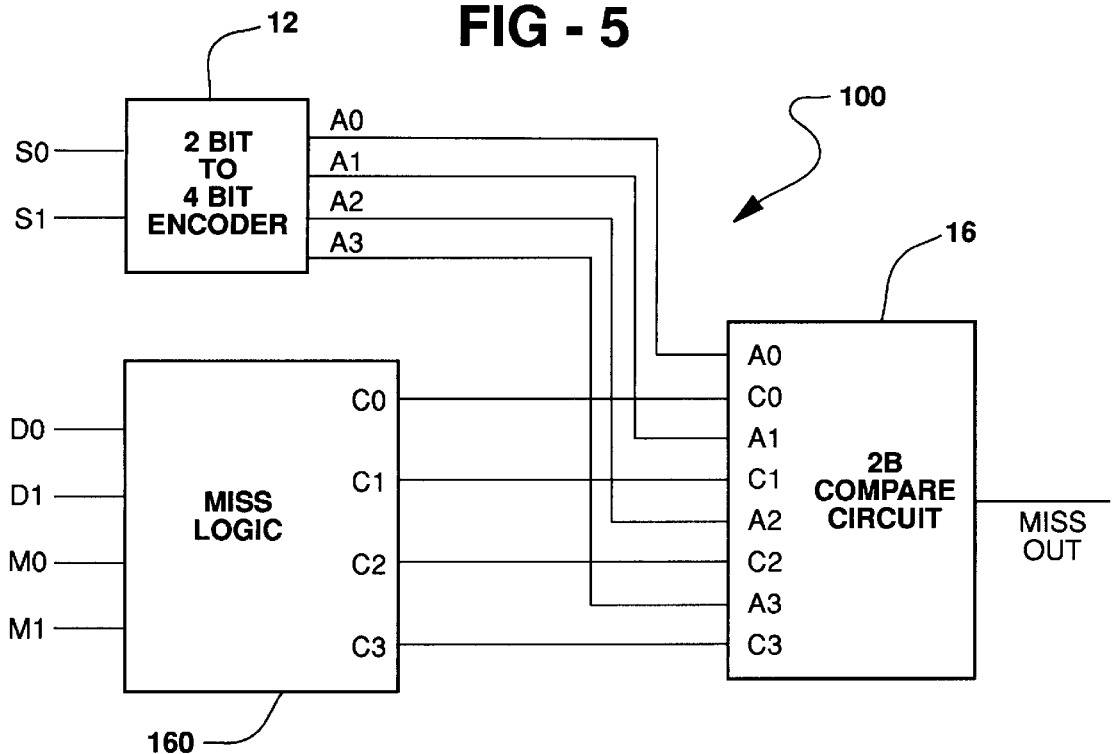
FIG. 5 is a schematic block diagram of a circuit for determining whether a current address is not within a range of addresses according to the present invention.

Referring now to FIG. 5, wherein reference numerals which are like or similar to the reference numerals used in FIGS. 2–4 indicate identical or similar components, a circuit 100 for determining whether an address is within a range of addresses is shown. Whereas circuit 10 indicates whether an address is within a range of addresses, circuit 100 determines whether an address is not within a range of addresses. Thus, the output of compare circuit 16 in circuit 10 indicates that a match has occurred when in the logical 1 state, and the output of compare circuit 16 in circuit 100 indicates that a miss has occurred when the output is logical 1. Circuit 100 is identical to circuit 10 except that miss logic 160 replaces match logic 14. Miss logic 160 has input bits D0, D1, M0, M1 and output bits C0, C1, C2, and C3. Thus, with circuit 100, compare circuit 16 compares bits A0 through A3 to bits C0 through C3. Table 3 sets forth a truth table which describes the relationship between input bits D0, D1, M0, M1 and output bits C0 through C3. Bits C0 through C3 represent the result of the logical operation that includes the 2B encoding of bits D0 and D1 and the application of the appropriate mask bits such that when bits C0 through C3 are fed into the two-bit comparator circuit 16 shown in detail in FIG. 4, the correct miss functionality is realized.

TABLE 3

Truth Table for Masking and 2B Encoding for Miss Generation

| D0 | D1 | M0 | M1 | C0 | C1 | C2 | C3 |
|----|----|----|----|----|----|----|----|
| 0 | 0 | 0 | 0 | 1 | 1 | 1 | 0 |
| 0 | 1 | 0 | 0 | 1 | 1 | 0 | 1 |
| 1 | 0 | 0 | 0 | 1 | 0 | 1 | 1 |
| 1 | 1 | 0 | 0 | 0 | 1 | 1 | 1 |
| 0 | 0 | 0 | 1 | 1 | 1 | 0 | 0 |
| 0 | 1 | 0 | 1 | 1 | 1 | 0 | 0 |
| 1 | 0 | 0 | 1 | 0 | 0 | 1 | 1 |
| 1 | 1 | 0 | 1 | 0 | 0 | 1 | 1 |
| 0 | 0 | 1 | 0 | 1 | 0 | 1 | 0 |
| 0 | 1 | 1 | 0 | 0 | 1 | 0 | 1 |
| 1 | 0 | 1 | 0 | 1 | 0 | 1 | 0 |
| 1 | 1 | 1 | 0 | 0 | 1 | 0 | 1 |
| 0 | 0 | 1 | 1 | 0 | 0 | 0 | 0 |
| 0 | 1 | 1 | 1 | 0 | 0 | 0 | 0 |
| 1 | 0 | 1 | 1 | 0 | 0 | 0 | 0 |
| 1 | 1 | 1 | 1 | 0 | 0 | 0 | 0 |

Figure 6:
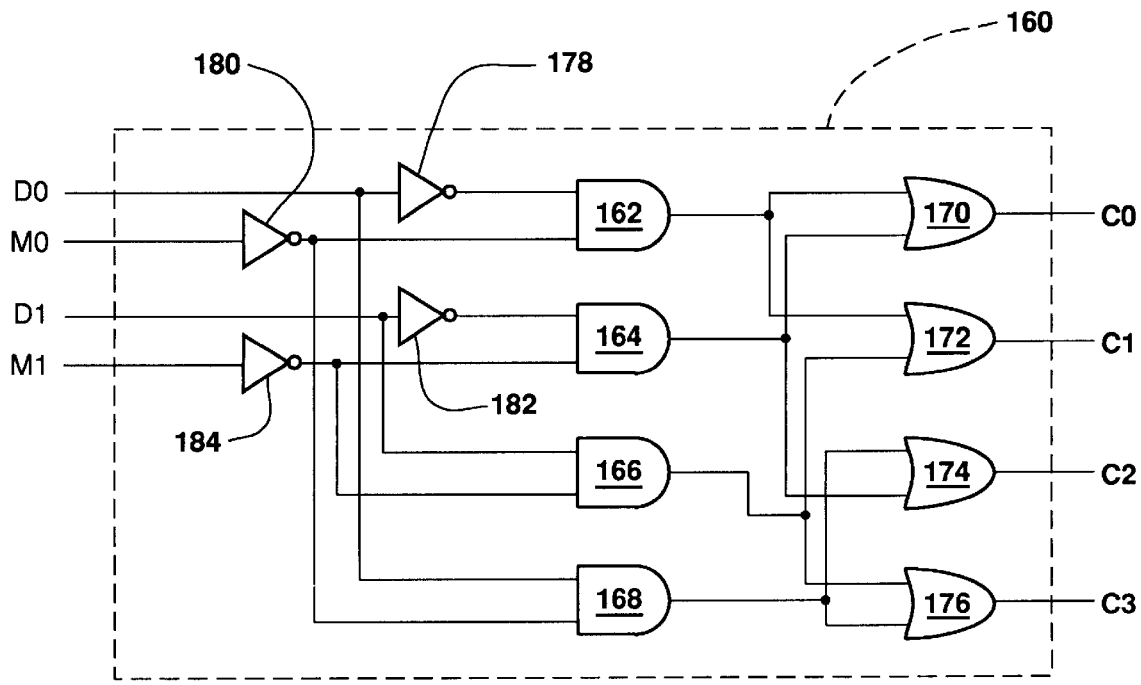
FIG. 6 is a logic diagram of the miss logic block set forth in FIG. 5 according to the present invention.

Referring now to FIG. 6, a detailed description of miss logic 160 will be described. Miss logic 160 includes AND gates 162, 164, 166, and 168 and OR gates 170, 172, 174, and 176. AND gate 162 ANDs bits $\overline{D0}$ and $\overline{M0}$, and its output is coupled to OR gates 170, 172. AND gate 164 ANDs bits $\overline{D1}$ and $\overline{M1}$, and its output is coupled to OR gate 170 and OR gate 174. AND gate 166 ANDs bits D1 and $\overline{M1}$, and its output is coupled to OR gates 172 and 176. AND gate 168 ANDs bits D0 and $\overline{M0}$, and its output is coupled to OR gates 174 and 176. $\overline{D0}$, $\overline{M0}$, $\overline{D1}$, and $\overline{M1}$ are generated by inverters 178, 180, 182, and 184, respectively. OR gates 170, 172, 174, 176 output bits C0, C1, C2, C3, respectively.

Although the present invention and its advantages have been described in detail, it should be understood that various changes, substitutions and alterations can be made herein without departing from the spirit or scope of the invention as defined in the appended claims.

What is claimed is:

1. A circuit for determining whether a current address is within a range of addresses wherein said addresses are represented by a number of binary logic bits, said circuit comprising:

means for encoding a set of the bits of the current address into a corresponding encoded set wherein only one bit of said encoded set has a predefined logic state; and logic means for translating a set of bits for indicating the range of addresses into a corresponding translated set of bits that can be compared to said encoded set of bits of the current address to determine whether the current address is within the range of addresses, wherein said means for encoding includes means for grouping a set of the bits of the current address into sets of two logic bits, wherein said means for encoding include means for encoding said sets of two logic bits into corresponding encoded sets of four logic bits wherein only one of the four logic bits is in an on state.

2. The circuit, as recited in claim 1, further including a comparator circuit for comparing said translated set of bits to said encoded set of bits of the current address to determine whether the current address is within the range of addresses.

3. The circuit, as recited in claim 1, wherein said logic means includes means for indicating that the current address is within the range of addresses.

4. The circuit, as recited in claim 1, wherein said logic means includes means for indicating that the current address is not within the range of addresses.

5. The circuit, as recited in claim 1, wherein said logic means includes means for combining mask bits for indicating the size of the range of addresses and starting address bits for indicating the starting address of the range of addresses into a combined set of bits.

6. the circuit, as recited in claim 5, wherein said set of bits for indicating the range of addresses includes said combined set of bits.

7. An address translation circuit for translating an effective address into a real address including:

a subcircuit for determining whether an effective address is within a range of addresses wherein said addresses are represented by a number of binary logic bits, said subcircuit including:

means for encoding a set of the bits of the effective address into a corresponding encoded set wherein only one bit of said encoded set has a predefined logic state; and logic means for translating a set of bits for indicating the range of addresses into a corresponding translated set of bits that can be compared to said encoded set of bits of the effective address to determine whether the effective address is within the range of addresses, wherein said means for encoding includes means for grouping a set of the bits of the effective address into sets of two logic bits, wherein said means for encoding includes means for encoding said sets of two logic bits into corresponding encoded sets of four logic bits wherein only one of the four logic bits is in an on state.

8. The circuit, as recited in claim 7, further including a comparator circuit for comparing said translated set of bits to said encoded set of bits of the effective address to determine whether the effective address is within the range of addresses.

9. The circuit, as recited in claim 7, wherein said logic means includes means for indicating that the effective address is within the range of addresses.

10. The circuit, as recited in claim 7, wherein said logic means includes means for indicating that the effective address is not within the range of addresses.

11. The circuit, as recited in claim 7, wherein said logic means includes means for combining mask bits for indicating the size of the range of addresses and starting address bits for indicating the starting address of the range of addresses into a combined set of bits.

12. The circuit, as recited in claim 11, wherein said set of bits for indicating the range of addresses includes said combined set of bits.

13. A method for determining whether a current address is within a range of addresses wherein the addresses are represented by a number of binary logic bits, said method comprising the steps of:

encoding a set of the bits of the current address into a corresponding encoded set wherein only one bit of the encoded set has a predefined logic state; and translating a set of bits for indicating the range of addresses into a corresponding translated set of bits that can be compared to the encoded set of bits of the current address to determine whether the current address is within the range of addresses, wherein said step of encoding further includes the step of grouping a set of bits of the current address into sets of two logic bits, wherein the step of encoding further includes the step of encoding the sets of two logic bits into corresponding encoded sets of four logic bits wherein only one of the four logic bits is in an on state.

14. The method, as recited in claim 13, further including the step of comparing the translated set of bits to the encoded set of bits of the current address to determine whether the current address is within the range of addresses.

15. The method, as recited in claim 13, further including the step of indicating that the current address is within the range of addresses.

16. The method, as recited in claim 13, further including the step of indicating that the current address is not within the range of addresses.

17. The method, as recited in claim 13, further including the step of combining mask bits for indicating the size of the range of addresses and starting address bits for indicating the starting address of the range of addresses into a combined set of bits.

18. The method, as recited in claim 17, wherein said set of bits for indicating the range of addresses includes said combined set of bits.

19. A method for translating an effective address into a real address, said method including the steps of:

determining whether an effective address is within a range of addresses wherein the addresses are represented by a number of binary logic bits, said method of determining including the steps of:

encoding a set of the bits of the current effective address into a corresponding encoded set wherein only one bit of the encoded set has a predefined logic state; and translating a set of bits for indicating the range of addresses into a corresponding translated set of bits that can be compared to the encoded set of bits of the current address to determine whether the current effective address is within the range of addresses, wherein said step of encoding includes the step of grouping a set of the bits of the effective address into sets of two logic bits, wherein the step of encoding includes the step of encoding the sets of two logic bits into corresponding encoded sets of four logic bits wherein only one of the four logic bits is in an on state.

20. The method, as recited in claim 19, further comprising the step of comparing the translated set of bits to the encoded set of bits of the effective address to determine whether the effective address is within the range of addresses.

21. The method, as recited in claim 19, further including the step of step of indicating that the effective address is within the range of addresses.

22. The method, as recited in claim 19, further including the step of indicating that the current address is not within the range of addresses.

23. The method, as recited in claim 19, further including the step of combining mask bits for indicating the size of the range of addresses and starting address bits for indicating the starting address of the range of addresses into a combined set of bits.

24. The method, as recited in claim 23, wherein said set of bits for indicating the range of addresses includes said combined set of bits.

* * * * *